(12) United States Patent
Dudar

(10) Patent No.: US 11,400,806 B1
(45) Date of Patent: Aug. 2, 2022

(54) FUEL SYSTEM FOR A VEHICLE

(71) Applicant: FORD GLOBAL TECHNOLOGIES, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/242,417

(22) Filed: Apr. 28, 2021

(51) Int. Cl.
*B60K 15/03* (2006.01)
*B60K 15/035* (2006.01)

(52) U.S. Cl.
CPC .. *B60K 15/03519* (2013.01); *B60K 15/03504* (2013.01); *B60K 2015/03514* (2013.01)

(58) Field of Classification Search
CPC .............. B60K 15/03; B60K 15/03519; B60K 15/03504; B60K 2015/03514
See application file for complete search history.

(56) References Cited

U.S. PATENT DOCUMENTS

| | | | | |
|---|---|---|---|---|
| 5,297,529 | A * | 3/1994 | Cook | F02M 25/0818 123/198 D |
| 7,823,610 | B2 * | 11/2010 | King | B60K 15/04 141/303 |
| 8,944,100 | B2 * | 2/2015 | Pifer | F16K 17/0413 137/630.22 |
| 2016/0201614 | A1 | 7/2016 | Jentz et al. | |
| 2017/0234269 | A1 | 8/2017 | Pursifull et al. | |
| 2020/0182174 | A1 | 6/2020 | Dudar | |

* cited by examiner

*Primary Examiner* — Long T Tran
(74) *Attorney, Agent, or Firm* — Geoffrey Brumbaugh; Brooks Kushman P.C.

(57) ABSTRACT

A fuel system for a vehicle includes a first fluid flow path, a second fluid flow path, and a check valve. The first fluid flow path is configured to facilitate flow of liquid fuel into a fuel tank from a refueling nozzle. The second fluid flow path has parallel channels and is configured to facilitate flow of vaporized fuel between the fuel tank and a vapor canister. The check valve is disposed within a first of the parallel channels. The check valve is configured to close in response to the vaporized fuel flowing from the fuel tank to the canister. The check valve is configured to open in response to the vaporized fuel flowing from the canister to the fuel tank.

17 Claims, 2 Drawing Sheets

US 11,400,806 B1

FUEL SYSTEM FOR A VEHICLE

TECHNICAL FIELD

The present discloser relates to fuel systems for vehicles.

BACKGROUND

Vehicles may include fuel systems that are configured to deliver fuel from a fuel tank to an internal combustion engine.

SUMMARY

A fuel system for a vehicle includes a fuel tank, a vapor canister, a vent valve, a flow restrictor, and a check valve. The fuel tank is configured to receive liquid fuel via a first fluid flow path. The vapor canister is configured to store vaporized fuel. The vent valve is disposed on the fuel tank and is configured to vent the vaporized fuel from the fuel tank to the vapor canister via a second fluid flow path. A portion of the second fluid flow path is divided into first and second channels that are parallel to each other. The flow restrictor is disposed within the first channel and is configured to reduce a flow rate of the vaporized fuel between the fuel tank and the vapor canister. The check valve disposed within the second channel. The check valve is configured to close in response to the vaporized fuel flowing from the fuel tank to the canister. The check valve is configured to open in response to the vaporized fuel flowing from the canister to the fuel tank.

A fuel system for a vehicle includes a fuel tank, a vapor canister, and a fluid flow path. The fuel tank is configured to store liquid and vaporized fuel. The vapor canister configured to store the vaporized fuel. The fluid flow path is configured to facilitate flow of the vaporized fuel between the fuel tank and the vapor canister. A portion of the fluid flow path is divided into first and second channels that are parallel to each other. The check valve is disposed within the first channel. The check valve is configured to close in response to a pressure of the vaporized fuel in the fuel tank being greater than a pressure of the vaporized fuel in the canister. The check valve is configured to open in response to the pressure of vaporized fuel in the canister being greater than a pressure of the vaporized fuel in the fuel tank.

A fuel system for a vehicle includes a first fluid flow path, a second fluid flow path, and a check valve. The first fluid flow path is configured to facilitate flow of liquid fuel into a fuel tank from a refueling nozzle. The second fluid flow path has parallel channels and is configured to facilitate flow of vaporized fuel between the fuel tank and a vapor canister. The check valve is disposed within a first of the parallel channels. The check valve is configured to close in response to the vaporized fuel flowing from the fuel tank to the canister. The check valve is configured to open in response to the vaporized fuel flowing from the canister to the fuel tank.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
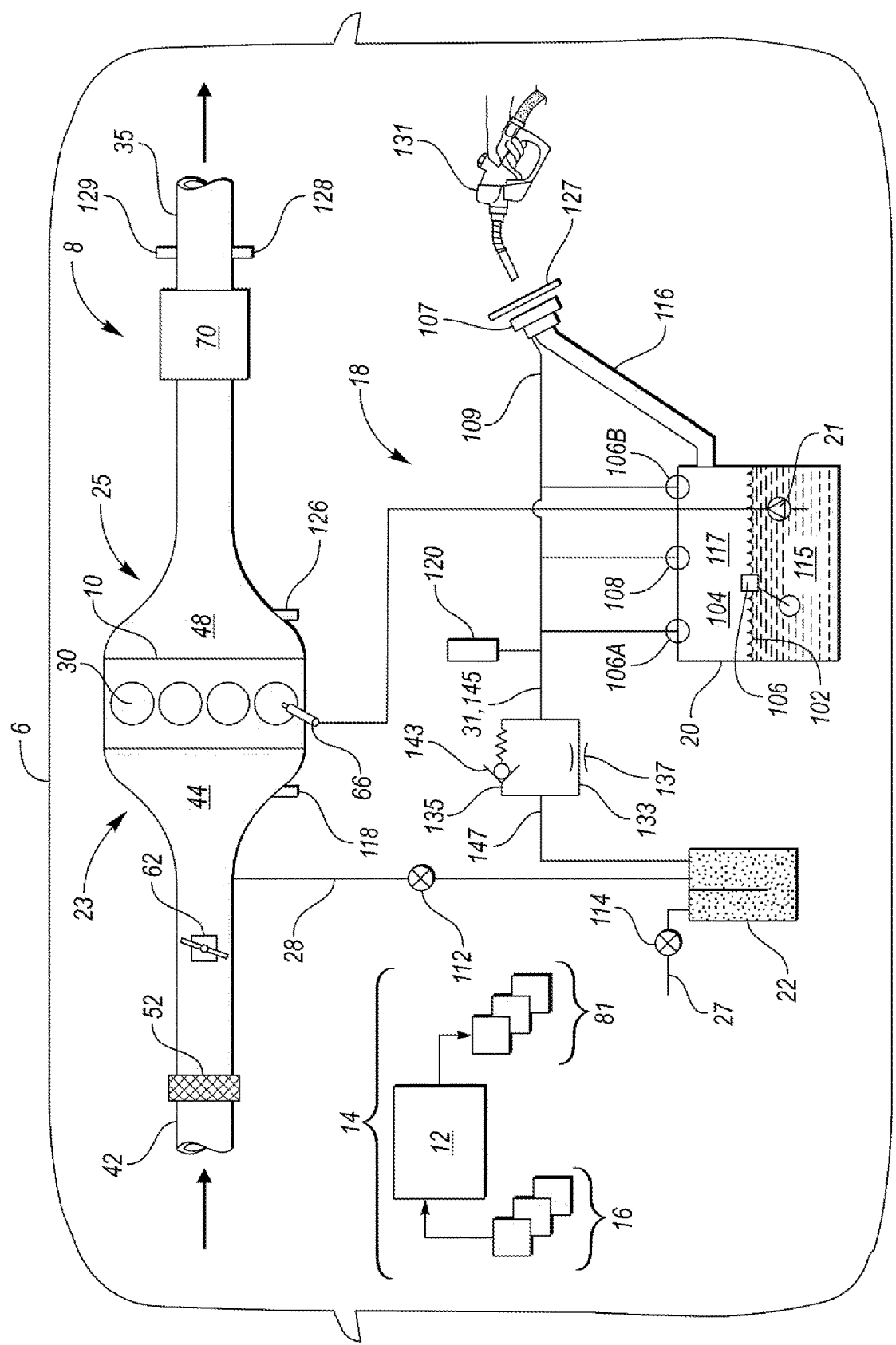
FIG. 1 is a schematic illustration of a vehicle and a fuel system for the vehicle.

FIG. 1 shows a schematic depiction of a vehicle 6, an engine system 8, and a fuel system 18. The fuel system 18 may more specifically be a fuel delivery system for an engine 10. The vehicle 6 may be a hybrid vehicle, such as a hybrid electric vehicle. A hybrid electric vehicle may derive propulsion power from the engine system 8 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device. Alternatively, the vehicle 6 may be a non-hybrid vehicle, such as a conventional internal combustion engine vehicle.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices 70 may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

When configured as a hybrid vehicle, the vehicle may be operated in various modes. The various modes may include a full hybrid mode or battery mode, wherein the vehicle is driven by power from only the battery. The various modes may further include an engine mode wherein the vehicle is propelled with power derived only from the combusting engine. Further, the vehicle may be operated in an assist or mild hybrid mode wherein the engine is the primary source of torque and the battery selectively adds torque during specific conditions, such as during a tip-in event. A controller may shift vehicle operation between the various modes of operation based at least on vehicle torque/power requirements and the battery's state of charge. For example, when the power demand is higher, the engine mode may be used to provide the primary source of energy with the battery used selectively during power demand spikes. In comparison, when the power demand is lower and while the battery is sufficiently charged, the vehicle may be operated in the battery mode to improve vehicle fuel economy. Further, as elaborated herein, during conditions when a fuel tank vacuum level is elevated, the vehicle may be shifted from the engine mode of operation to the battery mode of operation to enable excess fuel tank vacuum to be vented to the engine's intake manifold without causing air-fuel ratio disturbances.

Engine system 8 is coupled to the fuel system 18. Fuel system 18 includes a fuel tank 20 coupled to a fuel pump 21 and a fuel vapor canister 22. Fuel tank 20 receives fuel via a refueling line 116, which acts as a passageway between the fuel tank 20 and a refueling door 127 on an outer body of the vehicle. During a fuel tank refueling event, fuel may be pumped into the vehicle from an external source through refueling inlet 107 that is in fluid communication with refueling line 116. Fueling inlet 107 may be covered by a gas cap or may be capless. Vent valves 106A, 106B, 108 (described below in further details) may be open to recover fuel vapors (i.e., fuel that has been vaporized into a gaseous form) from a vapor space 104 within the fuel tank 20 during a refueling event where a refueling nozzle 131 is directing liquid fuel into the fuel tank via the refueling line 116. The fuel tank 20 may be configured to store both liquid fuel 115 and vaporized fuel 117. The refueling line 116 may be referred to as a fluid flow path that is configured to facilitate flow of liquid fuel into the fuel tank 20 from the refueling nozzle 131.

The fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to a controller 12. As depicted, fuel level sensor 106 may comprise a float connected to a variable resistor. Alternatively, other types of fuel level sensors may be used.

A fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system.

In some embodiments, engine 10 may be configured for selective deactivation. For example, engine 10 may be selectively deactivatable responsive to idle-stop conditions. Therefore, responsive to any or all of idle-stop conditions being met, the engine 10 may be selectively deactivated by deactivating cylinder fuel injectors. As such, idle-stop conditions may be considered met if the engine 10 is combusting while a system battery (or energy storage device) is sufficiently charged, if auxiliary engine loads (e.g., air conditioning requests) are low, engine temperatures (intake temperature, catalyst temperature, coolant temperature, etc.) are within selected temperature ranges where further regulation is not required, and a driver requested torque or power demand is sufficiently low. In response to idle-stop conditions being met, the engine may be selectively and automatically deactivated via deactivation of fuel and spark. The engine may then start to spin to rest. Further, as elaborated herein, during conditions when fuel tank vacuum is elevated, the engine may be actively pulled-down, or deactivated, so as to enable the fuel tank vacuum to be vented to the deactivated engine.

Fuel vapors generated in fuel tank 20 may be routed to and stored in fuel vapor canister 22, via conduit 31, before being purged to engine intake 23. Fuel tank 20 may include one or more vent valves for venting fuel vapors generated in the fuel tank 20 to fuel vapor canister 22 via conduit 31. Conduit 31 may also be referred to as a fluid flow path that is configured to facilitate flow of the vaporized fuel between the fuel tank 20 and the vapor canister 22. Conduit 31 may also be in fluid commination with the refueling inlet 107 via vapor line 109. The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). In the depicted example, fuel tank 20 includes gas vent valves (GVV) 106A, 106B at either end of fuel tank 20 and a fuel level vent valve (FLVV) 108, all of which are passive vent valves. Each of the vent valves 106A, 106B, 108 may include a tube (not shown) that dips to a varying degree into a vapor space 104 of the fuel tank. Based on a fuel level 102 relative to vapor space 104 in the fuel tank, the vent valves may be open or closed. For example, GVV 106A, 106B may dip less into vapor space 104 such that they are normally open. This allows diurnal and "running loss" vapors from the fuel tank to be released into canister 22, preventing over-pressurizing of the fuel tank. As another example, FLVV 108 may dip further into vapor space 104 such that it is normally open. This allows fuel tank overfilling to be prevented. In particular, during fuel tank refilling, when a fuel level 102 is raised, vent valve 108 may close, causing pressure to build in vapor line 109 (which is downstream of refueling inlet 107 and coupled thereon to conduit 31) as well as at the refueling nozzle 131 that is coupled to the fuel pump. The increase in pressure at the refueling nozzle 131 may then trip the refueling pump, stopping the fuel fill process automatically, and preventing overfilling.

It will be appreciated that while the depicted embodiment shows vent valves 106A, 106B, 108 as passive valves, in alternate embodiments, one or more of them may be configured as electronic valves electronically coupled to a controller (e.g., via wiring). Therein, a controller may send a signal to actuate the vent valves to open or close. In addition, the valves may include electronic feedback to communicate an open/close status to the controller. While the use of electronic vent valves having electronic feedback may enable a controller to directly determine whether a vent valve is open or closed (e.g., to determine if a valve is closed when it was supposed to be open), such electronic valves may add substantial costs to the fuel system.

The fuel vapor canister 22 is filled with an appropriate adsorbent for temporarily trapping fuel vapors (including vaporized hydrocarbons) generated during fuel tank particularly during diurnal cycles. In one example, the adsorbent used is activated charcoal. When purging conditions are met, such as when the canister 22 is saturated, vapors stored in fuel vapor canister 22 may be purged to engine intake 23, specifically intake manifold 44, via purge line 28 by opening canister purge valve 112. While a single canister 22 is shown, it will be appreciated that fuel system 18 may include any number of canisters.

Canister 22 includes a vent 27 (herein also referred to as a fresh air line) for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve 114 may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve 114 may be opened to allow a flow of fresh air to strip the fuel vapors stored in the canister 22. By closing canister vent valve 114, the fuel tank 20 may be isolated from the atmosphere.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 coupled between the fuel tank and canister 22, in alternate embodiments, the pressure sensor may be directly coupled to fuel tank 20.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve 112 may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode wherein the controller 12 may close canister purge valve (CPV) 112 and open canister vent valve 114 to direct refueling and diurnal vapors into canister 22 while preventing fuel vapors from being directed into the intake manifold. As another example, the fuel system may be operated in a refueling mode (e.g., when fuel tank refueling is requested by a vehicle operator), wherein the controller 12 may maintain canister purge valve 112 closed, to depressurize the fuel tank before allowing enabling fuel to be added therein. As such, during both fuel storage and refueling modes, the fuel tank vent valves 106A, 106B, and 108 are assumed to be open.

As yet another example, the fuel system may be operated in a canister purging mode (e.g., after an emission control device light-off temperature has been attained and with the engine running), wherein the controller 12 may open canister purge valve 112 and open canister vent valve 114. As such, during the canister purging, the fuel tank vent valves 106A, 106B, and 108 are assumed to be open (though is some embodiments, some combination of valves may be closed). During this mode, vacuum generated by the intake manifold of the operating engine may be used to draw fresh air through vent 27 and through fuel vapor canister 22 to purge the stored fuel vapors into intake manifold 44. In this mode, the purged fuel vapors from the canister 22 are combusted in the engine. The purging may be continued until the stored fuel vapor amount in the canister is below a threshold. During purging, the learned vapor amount/concentration can be used to determine the amount of fuel vapors stored in the canister 22, and then during a later portion of the purging operation (when the canister 22 is sufficiently purged or empty), the learned vapor amount/concentration can be used to estimate a loading state of the fuel vapor canister 22. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister 22). Based on the canister load, and further based on engine operating conditions, such as engine speed-load conditions, a purge flow rate may be determined.

The vehicle 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas (air/fuel ratio) sensor 126 located upstream of the emission control device, exhaust temperature sensor 128, MAP sensor 118, and exhaust pressure sensor 129. Other sensors such as additional pressure, temperature, air/fuel ratio, and composition sensors may be coupled to various locations in the vehicle 6. As another example, the actuators may include fuel injector 66, canister purge valve 112, canister vent valve 114, and throttle 62. The control system 14 may include controller 12. The controller 12 may receive input data from the various sensors, process the input data, and trigger the actuators in response to the processed input data based on instruction or code programmed therein corresponding to one or more routines.

While illustrated as one controller, the controller 12 may be part of a larger control system and may be controlled by various other controllers throughout the vehicle 6, such as a vehicle system controller (VSC). It should therefore be understood that the controller 12 and one or more other controllers can collectively be referred to as a "controller" that controls various actuators in response to signals from various sensors to control functions the vehicle 6 or vehicle subsystems. The controller 12 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 12 in controlling the vehicle 6 or vehicle subsystems.

Control logic or functions performed by the controller 12 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 12. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

If the system for recovering fuel vapors is an onboard refueling vapor recovery (ORVR) system, the vapor canister 22 has to be sized to adsorb fuel vapors during refueling, during running loss, during hot soak, and in response to diurnal temperature changes. The fuel vapors generated during refueling are most significant when determining the appropriate size for the vapor canister 22 since the fuel vapors generated during refueling are the biggest component of the aggregate of all the fuel vapors that will be generated. If the system for recovering fuel vapors is an offboard refueling vapor recovery (non-ORVR) system, the size of the vapor canister 22 may be much smaller relative to a ORVR system, since the fuel vapors are recovered by the gas station infrastructure during refueling. Offboard recovery requires special refueling nozzles with boots that seal around the filler neck. During refueling, the nozzle generates vacuum which sucks the fuel vapors into an underground tank, where the fuel vapors are condensed.

While ORVR systems are designed to vent adequately from the fuel tank 20 to the vapor canister 22, non-ORVR systems may restrict venting via an orifice, as fuel vapors generated during refueling are returned back to the refueling inlet 107 via a large diameter recirculation line (e.g., the portion of vapor line 109 that extends from vent valve 106B to the refueling inlet 107, which may have a larger inner diameter than the remainder of vapor line 109 so that the path of least resistance for the fuel vapors is to return to the refueling inlet 107). With ORVR systems, the recirculation line (e.g., the portion of vapor line 109 that extends from vent valve 106B to the refueling inlet 107) may be smaller relative to non-ORVR systems so that just enough fuel vapor may be recirculated such that no fuel vapors are vented out of the area of the refueling inlet 107, which prevents an in increase in emissions. The recirculation line in ORVR systems typically has an orifice to regulate how much vapor can circulate without expelling excess vapor out of the area of the refueling inlet 107. The orifice size may determined offline during ORVR certification testing and may range from 2 mm to 3.5 mm.

ORVR systems promote the flow of fuel vapors from the fuel tank 20 to the vapor canister 22 and restrict recirculation of fuel vapors to the area of the refueling inlet 107. Non-ORVR systems on the other hand restrict the flow fuel vapors to from the fuel tank 20 to the vapor canister 22, but promote flow to the recirculation line (i.e., the portion of vapor line 109 that extends from vent valve 106B to the refueling inlet 107). Due to the restriction between the fuel tank 20 and the vapor canister 22, back purging (i.e., a flow of fuel vapor from the vapor canister 22 back to the fuel tank 20) is restricted and not fully leveraged in non-ORVR vehicles, since the orifice restricts the flow of fuel vapor from vapor canister 22 to fuel tank 20.

While restricting communication between the fuel tank 20 and the vapor canister 22 in a non-ORVR system is desirable to ensure fuel vapors are sucked into the offboard recovery equipment during the refueling event, during the night hours when fuel cools down, it is advantageous to promote fluid communications between the fuel tank 20 and the canister 22 to allow fuel vapors to flow back into the fuel tank 20 from the vapor canister 22 (i.e., back purging). The system described herein allows for back purging in vehicle having non-ORVR fuel systems.

Figure 2:
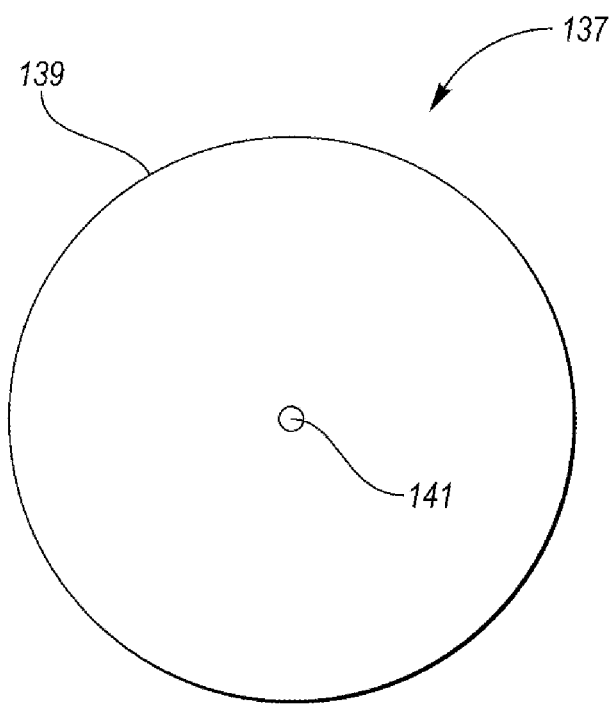
FIG. 2 is a front view of a flow restrictor plate.

The system disclose herein, includes dividing a portion of the fluid flow path that is configured to facilitate flow of the vaporized fuel between the fuel tank 20 and the vapor canister 22 (i.e., conduit 31) into parallel conduit or channels. More specifically, the parallel paths or channels may include a first channel 133 and a second channel 135. A flow restrictor 137 may be disposed within the first channel 133. The flow restrictor 137 may be configured to reduce a flow rate of the vaporized fuel between the fuel tank 20 and the vapor canister 22. The flow restrictor 137 may more specifically be a restrictor plate 139 that defines an orifice 141 (See FIG. 2). The orifice 141 may regulate how much vapor can circulate without expelling excess vapor out of the area of the refueling inlet 107.

A check valve 143 may be disposed within the second channel 135. The check valve 143 may more specifically be a spring-loaded ball check valve. However, the check valve 143 may be any type of check valve including spring-loaded check valves, diaphragm check valves, etc. The check valve 143 may be a passive device that is configured to open and closed automatically based on the pressure differential on each side of the check valve 143. However, it should be understood that the check valve 143 may be any type of check valve that may operate automatically or may be controlled by an electronic control system. The check valve 143 may be configured to close in response to the vaporized fuel flowing from the fuel tank 20 to the vapor canister 22 via conduit 31 (e.g., when a pressure of the vaporized fuel in the fuel tank 20 is greater than a pressure of the vaporized fuel in the vapor canister 22). The check valve 143 may be configured to open in response to the vaporized fuel flowing from the vapor canister 22 to the fuel tank 20 (e.g., when the pressure of vaporized fuel in the vapor canister 22 is greater than the pressure of the vaporized fuel in the fuel tank 20).

The first channel 133 and the second channel 135 diverge from a third channel 145 that extends from the fuel tank 20.

The first channel 133 and the second channel 135 converge into a fourth channel 147 that extends to the vapor canister 22. During hours when back or reverse purge is possible (e.g., nighttime when the fuel within the fuel tank 20 cools down), the check valve 143 may be opened by the natural vacuum that builds inside the fuel tank 20. This allows for fluid communication between the vapor canister 22 and the fuel tank 20 and facilitates back purge so that fuel vapors flow from the vapor canister 22 back into the fuel tank 20. It is noted that the check valve 143 closes when fuel tank 20 is under pressure and during refueling, which is desirable in non-ORVR systems since the vapor canister 22 is typically only sized for diurnal vapor loading. The system disclosed herein allows for non-ORVR fuel systems to benefit from naturally occurring reverse purges that occur when the fuel vapor within the system cools down at nighttime, which helps to reduce evaporative emissions.

It should be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A fuel system for a vehicle comprising:
   a fuel tank configured to receive liquid fuel via a first fluid flow path;
   a vapor canister configured to store vaporized fuel;
   a vent valve disposed on the fuel tank and configured to vent the vaporized fuel from the fuel tank to the vapor canister via a second fluid flow path, wherein a portion of the second fluid flow path is divided into first and second channels that are parallel to each other, and wherein the first and second channels diverge from a third channel that extends toward the fuel tank;
   a flow restrictor disposed within the first channel and configured to reduce a flow rate of the vaporized fuel between the fuel tank and the vapor canister; and
   a check valve disposed within the second channel, wherein check valve is (i) configured to close in response to the vaporized fuel flowing from the fuel tank to the canister and (ii) to open in response to the vaporized fuel flowing from the canister to the fuel tank.

2. The fuel system of claim 1, wherein flow restrictor is a restrictor plate that defines an orifice.

3. The fuel system of claim 1, wherein the first and second channels converge into a fourth channel that extends toward the vapor canister.

4. The fuel system of claim 1, wherein the check valve is a spring-loaded ball check valve.

5. The fuel system of claim 1, wherein the first fluid flow path and the second fluid flow path are in fluid communication with a refueling inlet that is configured to receive a refueling nozzle.

6. A fuel system for a vehicle comprising:
   a fuel tank configured to store liquid and vaporized fuel;
   a vapor canister configured to store the vaporized fuel;
   a fluid flow path configured to facilitate flow of the vaporized fuel between the fuel tank and the vapor canister, wherein a portion of the fluid flow path is divided into first and second channels that are parallel to each other;
   a check valve disposed within the first channel, wherein check valve is (i) configured to close in response to a pressure of the vaporized fuel in the fuel tank being greater than a pressure of the vaporized fuel in the canister and (ii) to open in response to the pressure of vaporized fuel in the canister being greater than the pressure of the vaporized fuel in the fuel tank; and
   a second fluid flow path that is configured to facilitate flow of the liquid fuel into the fuel tank from a refueling nozzle.

7. The fuel system of claim 6 further comprising a flow restrictor disposed within the second channel and configured to reduce a flow rate of the vaporized fuel between the fuel tank and the vapor canister.

8. The fuel system of claim 7, wherein the flow restrictor is a restrictor plate that defines an orifice.

9. The fuel system of claim 6, wherein the fluid flow path includes a third channel that extends toward the fuel tank, and wherein the first and second channels diverge from the third channel.

10. The fuel system of claim 9, wherein the third channel is in fluid communication with a vent valve that is disposed on the fuel tank.

11. The fuel system of claim 9, wherein the fluid flow path includes a fourth channel that extends toward the vapor canister, and wherein the first and second channels converge into the fourth channel.

12. The fuel system of claim 6, wherein the check valve is a spring-loaded ball check valve.

13. The fuel system of claim 6, wherein the first fluid flow path and the second fluid flow path are in fluid communication with a refueling inlet that is configured to receive the refueling nozzle.

14. A fuel system for a vehicle comprising:
    a first fluid flow path configured to facilitate flow of liquid fuel into a fuel tank from a refueling nozzle;
    a second fluid flow path having parallel channels and configured to facilitate flow of vaporized fuel between the fuel tank and a vapor canister; and
    a spring-loaded ball check valve disposed within a first of the parallel channels, wherein the check valve is (i) configured to close in response to the vaporized fuel flowing from the fuel tank to the canister and (ii) to open in response to the vaporized fuel flowing from the canister to the fuel tank.

15. The fuel system of claim 14 further comprising a flow restrictor disposed within a second of the parallel channels and configured to reduce a flow rate of the vaporized fuel between the fuel tank and the vapor canister.

16. The fuel system of claim 15, wherein flow restrictor is a restrictor plate that defines an orifice.

17. The fuel system of claim 15, wherein the first and second of the parallel channels diverge from a third channel that extends from the fuel tank and converges into a fourth channel that extends to the vapor canister.

* * * * *